United States Patent [19]

St. Peters

[11] 4,107,536
[45] Aug. 15, 1978

[54] METHOD FOR ISOTOPE-SELECTIVE VIBRATIONAL EXCITATION OF A GASEOUS COMPOUND OF AN ISOTOPE USING MULTIPLE WAVELENGTHS

[75] Inventor: Richard L. St. Peters, Ballston Lake, N.Y.

[73] Assignee: General Electric Company, Schenectady, N.Y.

[21] Appl. No.: 499,170

[22] Filed: Aug. 21, 1974

[51] Int. Cl.² ............................................. H01J 39/34
[52] U.S. Cl. ........................... 250/423 P; 204/157.1 R
[58] Field of Search ................. 250/426.5, 423 P, 298, 250/290; 204/157.1, 162 R

[56] References Cited

U.S. PATENT DOCUMENTS

| | | | |
|---|---|---|---|
| 3,914,655 | 10/1975 | Dreyfus et al. | 250/423 P |
| 3,937,956 | 2/1976 | Lyon | 250/298 |

FOREIGN PATENT DOCUMENTS

| | | | |
|---|---|---|---|
| 2,312,194 | 10/1973 | Fed. Rep. of Germany | 250/423 P |
| 1,959,767 | 6/1971 | Fed. Rep. of Germany. | |
| 2,150,232 | 10/1971 | Fed. Rep. of Germany. | |

Primary Examiner—Alfred E. Smith
Assistant Examiner—T. N. Grigsby
Attorney, Agent, or Firm—Nathan D. Herkamp; Joseph T. Cohen; Leo I. MaLossi

[57] ABSTRACT

In an isotope-separation process, using polyatomic molecules having a complicated absorption spectrum such that the isotope shifts are masked, a plurality of laser pulses are used to irradiate a gaseous mixture of molecules including a compound of a desired isotope so as to raise the molecules thereof to higher vibrational energy levels which are substantially unpopulated thermally. The laser pulses have slightly different wavelengths corresponding to respective specific rotational lines of specific vibrational level transitions of molecules containing the desired isotope.

16 Claims, 3 Drawing Figures

METHOD FOR ISOTOPE-SELECTIVE VIBRATIONAL EXCITATION OF A GASEOUS COMPOUND OF AN ISOTOPE USING MULTIPLE WAVELENGTHS

My invention relates to an isotope-selective optical excitation method forming part of an optical isotope separation process, and in particular, to a method for obtaining isotope-selective vibrational excitation of polyatomic molecules having an absorption spectrum complicated by multiple contributions from a plurality of thermally populated levels such that the isotope shifts are masked.

U.S. Pat. No. 3,443,087 to Jean Robieux et al entitled "Isotopic Separation Process," and No. 3,772,519 to Richard H. Levy et al entitled "Method of and Apparatus for the Separation of Isotopes," and German Offenlegungsschrift Nos. 1,959,767 and 2,150,232 to Karl Gurs are related to my invention.

The separation of one isotope from a mixture of similar isotopes is of importance in many applications. Thus, separation of the fissionable uranium isotope $^{235}U$ from a binary mixture containing mainly nonfissionable $^{238}U$ is an important process for nuclear power applications. As another example, separation of the molybdenum isotope $^{98}Mo$ from other molybdenum isotopes is important for medical applications. In the case of uranium isotope separation, the anticipated demand of future nuclear power generation will require highly increased separation capacity which will hopefully incorporate more economical processes than those presently being utilized; namely, separation by gas diffusion through a porous barrier and separation by gas centrifugation. The disadvantages of the presently used uranium isotope separation processes are their high operating costs, high energy consumption, large plant size and low $^{235}U$ extraction efficiency.

Therefore, one of the principal objects of my invention is to provide a new method that is one step in an isotope separation process.

Another object of my invention is to provide a new method for exciting molecules containing a desired isotope in a gaseous mixture of molecules of the same compound containing other isotopes, so that a subsequent chemical or physical step can be used to readily separate the excited molecules from the mixture, effecting a separation of the desired isotope.

A further object of my invention is to provide the excitation so that only molecules containing the desired isotope are excited to higher vibrational energy levels.

It is known from the quantum theory and molecular spectroscopy that a molecule may exist in many different energy levels or states corresponding to different electronic orbits, different nuclear motions, and different rotational motions of the molecule. These energy states are generally described as, respectively, electronic energy levels, vibrational energy levels and rotational energy levels. The frequency $\nu$ of emitted or absorbed radiation for a transition between any two energy states $E_o$ and $E_1$ is given by $\nu = (E_1 - E_0)/h$ where $h$ is Planck's constant. For every molecule there exists a stable configuration corresponding to a minimum energy state generally known as the ground state. As a result of the above equation, the molecule may reach another, higher, energy level ($E_1$) from the ground state ($E_o$) by absorption of radiation having the frequency $\nu$.

For a molecule of a given element or compound, the excitation $h\nu$ necessary for raising the molecule to a higher energy level occurs only for a narrow line width centered at the particular value $\nu$ of the frequency of the exciting radiation, and for molecules of a different element or compound, or of the same element or compound, but a different isotope thereof, the corresponding excitation occurs for a different value of the excitation frequency. Thus, it should theoretically be possible to separate the molecules of a gaseous compound of a desired isotope from a mixture of molecules of the same compound, but containing different isotopes, by first irradiating the gas mixture with a radiation of the frequency specific to such particular isotope so that absorption of the radiation excites only the desired molecules to a higher energy level. However, for the molecules of interest herein (polyatomic molecules in the gaseous state) there are generally many thermally populated vibrational energy levels, each with many populated rotational levels, associated with the ground electronic state. Each of these vibrational levels contributes to the infrared vibrational absorption bands of the molecules, but the contributions of the various vibrational levels are shifted slightly relative to each other, due to anharmonicity and to coriolis forces. The individual vibrational-rotational lines of the various contributions thus do not coincide. If the number of contributions from various vibrational levels is large enough, the gaps between lines of any one contribution are filled by a plurality of lines from other contributions, masking the rotational fine structure. The molecules in the mixture containing other isotopes also have a like number of thermally populated vibrational levels and thus an equally dense spectrum. For some molecules (for example $SF_6$) the isotope shift is so large that the bands are completely separated. For others (for example $UF_6$) the isotope shift is small compared with the width of the band so the isotope-shifted bands overlap. It is evident that in this case, even though the isotope shift may be large compared to the width and spacing of the individual vibrational-rotational lines originating on any one vibration level, the absorption band for the particular compound is effectively continuous so that the isotope shift is not discernable due to its being masked by the presence of so many closely spaced spectral lines each of some finite width.

Therefore, another object of my invention is to provide a new method for exciting, in an isotope-selective manner, a particular polyatomic molecule having an absorption spectrum complicated by multiple contributions from a plurality of thermally populated energy levels so that the isotope shifts are masked.

Another object of my invention is to provide the method wherein the polyatomic molecules are excited through successive vibrational transitions.

Briefly stated, and in accordance with the objects of my invention, I provide a new optical excitation method in an isotope separation process utilizing a pulsed laser as the source of excitation energy. My method is especially well adapted for the excitation of polyatomic molecules, containing various isotopes having a fundamental absorption spectrum in the infrared region complicated by multiple contributions from a plurality of thermally populated levels such that the isotope shifts are masked. In my method, the compounds of isotopes are in a gaseous state, and a plurality of laser pulses irradiate the gaseous mixture with the laser pulses having successively slightly different wavelengths corresponding to specific selected rotational lines of specific vibrational energy level transitions for molecules containing the desired isotope. This irradiation with the slightly different wavelengths raises the molecules containing the desired isotope to higher vibrational energy levels which are substantially unpopulated thermally so that a subsequent chemical or physical step may be used to separate the excited molecules containing the desired isotope from the mixture. As a result of the first laser pulse at a wavelength corresponding to a selected rotational line of a first vibrational level transition, the specific selected rotational sublevel of a second higher vibrational level becomes populated. A second laser pulse occurring substantially simultaneously with the first pulse, but at a slightly different wavelength corresponding to a selected rotational line of the next higher vibrational level transition for the same desired isotope, results in populating the selected rotational sublevel in a third higher vibrational level. In a similar manner, additional substantially simultaneous laser pulses at slightly different wavelengths result in the desired molecules being excited to even higher vibrational energy levels which are substantially unpopulated thermally. The molecules containing other isotopes such as $^{238}UF_6$ in the case of uranium isotope separation, may also be vibrationally excited by the first laser pulse but are not generally further excited by the other slightly different wavelength laser pulses since there generally is not a coincidence of the absorption lines for the subsequent vibrational level transitions of such other molecules. Thus, after a few steps of laser excitation, the selected molecules containing the desired isotope in the gaseous mixture reach a vibrational energy level that is substantially completely unpopulated thermally by other molecules in the mixture as a result of the isotope-selective vibrational excitation using the multiple infrared wavelengths (slightly different frequencies) of laser excitation.

The features of my invention which I desire to protect herein are pointed out with particularity in the appended claims.

The invention itself, however, both as to its organization and method of operation together with further objects and advantages thereof may best be understood by reference to the following description taken in conjunction with the accompanying drawings in which.

Figure 1:
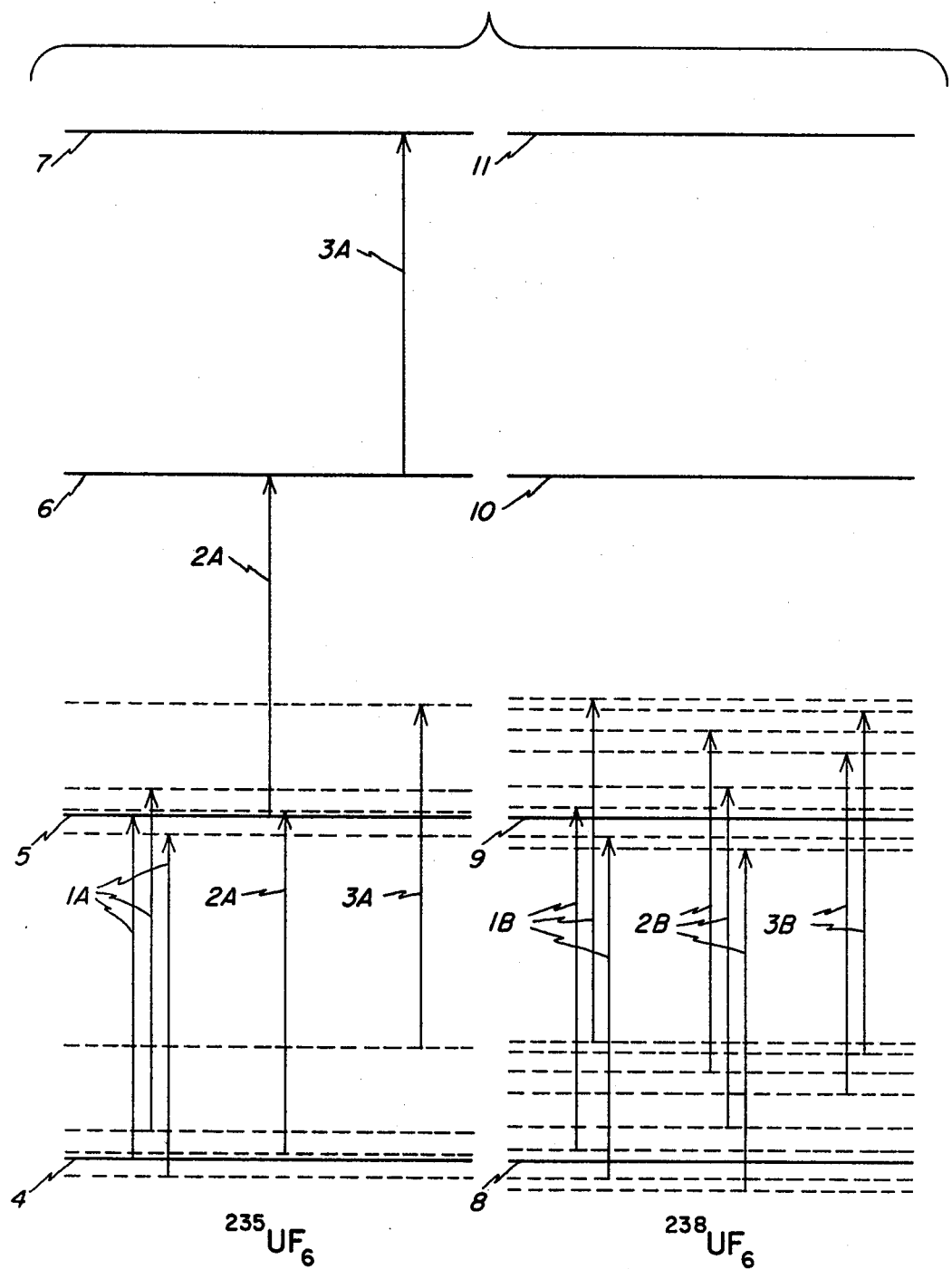
FIG. 1 is an energy-level diagram illustrating the energy-level transitions for isotopic compounds $^{235}UF_6$ and $^{238}UF_6$, as designated.

The following explanation of my isotope-selective vibrational excitation method will be with specific reference to the gaseous uranium isotopic compounds uranium hexafluoride, $^{235}UF_6$ and $^{238}UF_6$ which occur in a mixture wherein the $^{238}UF_6$ component is of much greater concentration than the desired $^{235}UF_6$ compound that includes the fissionable isotope $^{235}U$. However, my method is applicable to all isotopic compounds comprised of polyatomic molecules having a vibrational energy absorption spectrum in the infrared complicated by multiple contributions (spectral lines) from a plurality of thermally populated energy levels so that the isotope shifts are masked.

My method for isotope-selective vibrational excitation of a gaseous compound of an isotope using multiple wavelengths of radiation in the infrared spectrum emitted from a laser device will now be described. The gaseous mixture including the desired isotopic compound is pumped into, or through, a suitable chamber having a window through which the simultaneous or nearly simultaneous infrared radiation from the output of one or more pulsed laser sources can pass with negligible loss. The pulsed laser beam(s) is of large cross-sectional area so that it irradiates a substantial portion of the gaseous mixture within the chamber. As noted above, the gaseous mixture may be introduced into the chamber, and then momentarily maintained therein while undergoing irradiation from the pulsed laser source. Alternatively, the gaseous mixture may continually pass through the chamber while undergoing the irradiation which is of very short duration.

The isotopic compound $UF_6$ has six possible modes of vibration. A vibrational energy level is designated by $(n_1, n_2, n_3, n_4, n_5, n_6)$ where $n_i$ is the number of quanta of excitation of mode $i$. The vibrational mode of interest for $^{235}UF_6$ in my isotope-selective vibrational excitation method is the third mode which generates an infrared absorption band centered near 16 micrometers ($\mu$m) or, more specifically, at a wave number $\bar{\nu}$ ($\bar{\nu} = 1/\lambda$ where $\lambda$ is the wavelength) of 624 cm$^{-1}$ for the first vibrational energy transition. The ground vibrational level for the gaseous $UF_6$ molecules is designated (0, 0, 0, 0, 0, 0) and excitation (i.e., absorption of radiation) of these molecules at 624 cm$^{-1}$ results in the vibrational energy level transition:

$$(0, 0, 1, 0, 0, 0)_{235} \leftarrow (0, 0, 0, 0, 0, 0)_{235} \quad (1)$$

This transition consists of many individual vibrational-rotational lines, each line corresponding to a transition from a specific rotational level of the $(0, 0, 0, 0, 0, 0)_{235}$ state to a specific rotational level of the $(0, 0, 1, 0, 0, 0)_{235}$ state. Thus, this absorption band from the ground vibrational energy level is a fairly complex mixture of rotational lines. In spite of this complexity, however, these rotational lines are on the average well separated and resolved. And since the isotope shift between $^{235}UF_6$ and $^{238}UF_6$ is large compared to the line spacing, the conditions would appear very favorable for isotope-selective vibrational excitation of the $^{235}UF_6$ gas molecules.

Unfortunately, the uranium isotopic compound $UF_6$ has many low-lying vibrational energy levels. The fourth, fifth and sixth vibrational energy modes of $^{235}UF_6$ (at wave numbers 186, 202 and 142 cm$^{-1}$, respectively) are all $\lesssim$ 200 cm$^{-1}$, and at room temperature (300° K) the value $kT \approx 200$ cm$^{-1}$. Even the first three modes are only approximately 600 cm$^{-1} \approx 3$ kT. The mathematical term $kT$, where $k$ is the Boltzman constant and T is the absolute temperature in ° K, is involved in the Maxwell-Boltzman equation $N_i/N_j = (g_i/g_j)e^{-\Delta E/kT}$ where $(N_i/N_j)$ is the relative population of molecules in any two energy levels $E_i$ and $E_j$, $g_i$ and $g_j$ are the number of permitted states with energy $E_i$ and $E_j$, respectively, and $\Delta E$ is the difference in energy between the states $E_i$ and $E_j$. Many combinations of these various vibrational modes have energies low enough to have significant populations at room temperature. Furthermore, nearly all of these vibrational energy levels have $g_i$ factors much larger than one, i.e., these vibrational levels have multiple components. These components are not truly degenerate in energy, however, but are slightly shifted relative to each other, by anharmonicity for example. These components at low energy are so numerous that hundreds of them are occupied at room temperature. At room temperature, only 0.5% of the molecules are in the ground state, with the remaining 99.5% in excited vibrational levels and with no more than 0.5% in any one component of any level. Each component of each vibrational level contributes a vibrational band at 16 μm corresponding to a transition of the form $$(n_1, n_2, n_3, n_4, n_5, n_6) \leftarrow (n_1, n_2, n_3, n_4, n_5, n_6).$$

Each of these bands is similar to the one contributed by the ground state, but is shifted slightly in wavelength due to the shifts of the vibrational levels from the exactly harmonic energies. Furthermore, the rotational levels of each vibrational level are shifted by coriolis forces on the atoms of the rotating molecules, and these level shifts lead to additional shifts of the lines of the band contributed by each component. These multiple bands fill in the spaces between lines of each other. The 16 μm absorption band of $UF_6$ is thus effectively continuous and the isotope shift (between $^{235}UF_6$ and $^{238}UF_6$) cannot be easily utilized since it is masked by the multiple contributions from the plurality of thermally populated energy levels as well as from the other effects noted above. However, my invention overcomes this difficulty as will now be described.

My method for the isotope-selective vibrational excitation of polyatomic molecules as a step in an optical isotope separation process basically consists of irradiating the gaseous mixture of isotopic compounds with photons substantially simultaneously from a number of pulsed laser sources generating pulses having slightly different wavelengths in the infrared spectrum corresponding to specific selected rotational absorption lines in specific vibrational energy transitions of the desired isotopic compound. Alternatively, a single laser source having the capability for emitting all the desired wavelengths simultaneously may be utilized for simultaneously generating the multi-wavelength pulses. As a result, as described below, only the desired polyatomic molecules are excited to a specific higher vibrational energy level essentially unpopulated thermally while not raising the other (undesired) polyatomic molecules to such higher vibrational energy levels. For simplicity of description, my method will be described in terms of using one set of wavelengths to vibrationally excite, in several steps, $^{235}UF_6$ molecules which are initially in a single vibrational-rotational level of the ground electronic state. Any such level which is populated can be used; for illustration purposes a rotational level of the ground vibrational level is assumed.

The degree of vibrational excitation desired varies, depending on the subsequent processing of the vibrationally excited molecules in an isotope separation process. At least two steps of excitation are required; for description purposes six steps are considered here. Thus, for six vibrational transitions, six laser devices are utilized and tuned to the six slightly different wavelengths in the 16 μm $\nu_3$ infrared band corresponding to the six selected rotational lines in the six third-mode vibrational transitions. The first rotational line is selected to correspond to a transition upward from the selected initial rotational level. It is thus a rotational line of the vibrational transition $$(0, 0, 1, 0, 0, 0)_{235} \leftarrow (0, 0, 0, 0, 0, 0)_{235},$$

and excitation at this wavelength will populate a rotational sublevel of the $(0, 0, 1, 0, 0, 0)_{235}$ vibrational level. The second wavelength is chosen to correspond to a rotational line originating on this newly populated rotational sublevel, which is a rotational line of the vibrational transition $$(0, 0, 2, 0, 0, 0)_{235} \leftarrow (0, 0, 1, 0, 0, 0)_{235}.$$

Excitation at this wavelength populates a rotational sublevel of the $(0, 0, 2, 0, 0, 0)_{235}$ vibrational level with molecules which were originally in the selected initial rotational sublevel of the ground vibrational and have now been excited twice. The third wavelength is chosen at an absorption line in the $\nu_3$ band of these twice-excited molecules and thus excites them a third time. The remaining three wavelengths are chosen in a similar manner, and excitation at these wavelengths results in exciting these molecules to a rotational sublevel of the (0, 0, 6, 0, 0, 0) vibrational state. The simultaneous irradiation of the gas mixture by the six laser devices results in the following six vibrational level transitions for each $^{235}UF_6$ molecule which is excited.

$$(0, 0, 1, 0, 0, 0)_{235} \leftarrow (0, 0, 0, 0, 0, 0)_{235} \quad (3)$$

$$(0, 0, 2, 0, 0, 0)_{235} \leftarrow (0, 0, 1, 0, 0, 0)_{235} \quad (4)$$

$$(0, 0, 3, 0, 0, 0)_{235} \leftarrow (0, 0, 2, 0, 0, 0)_{235} \quad (5)$$

$$(0, 0, 4, 0, 0, 0)_{235} \leftarrow (0, 0, 3, 0, 0, 0)_{235} \quad (6)$$

$$(0, 0, 5, 0, 0, 0)_{235} \leftarrow (0, 0, 4, 0, 0, 0)_{235} \quad (7)$$

$$(0, 0, 6, 0, 0, 0)_{235} \leftarrow (0, 0, 5, 0, 0, 0)_{235} \quad (8)$$

My above-described method for exciting the $^{235}UF_6$ molecules into the higher vibrational energy states assumed reactions with molecules that were in a specific initial rotational sublevel of the $(0, 0, 0, 0, 0, 0)_{235}$ vibrational energy level. Since other molecules also exist in the gaseous mixture being irradiated, and since the wavelengths above will be absorbed by some of these molecules, consideration must now be given to such other molecules during the irradiation steps enumerated above. These other molecules can be divided into two classes (1) $^{235}UF_6$ molecules in other initial states, and (2) $^{238}UF_6$ molecules. Any molecules of class (1) which are excited to the higher vibrational states along with the molecules in the selected initial state are an added benefit of my method since they provide additional $^{235}UF_6$ excited molecules, however, their number is generally limited. Any molecules of class (2) which are excited to the higher vibrational states are a disadvantage since they interfere with the isotope selectivity. However, it can be shown that the $^{238}UF_6$ molecules are not excited to the higher vibrational energy levels and will not in general be excited to the highest vibrational energy levels to which the $^{235}UF_6$ molecules are excited in the final step. For a $^{238}UF_6$ molecule to absorb the first wavelength, that wavelength must correspond to a rotational line of a $^{238}UF_6$ transition such as:

$$(n_1, n_2, n_3 + 1, n_4, n_5, n_6)_{238} \leftarrow (n_1, n_2, n_3, n_4, n_5, n_6)_{238}. \quad (9)$$

Thus, a laser pulse at the first wavelength populates a specific rotational sublevel of the $(n_1, n_2, n_3 + 1, n_4, n_5,$ $n_6)_{238}$ vibrational energy state. In general, however, because of differing anharmonicity and coriolis effects, and different J values wherein the J value is the rotational angular momentum quantum number, the subsequent absorption lines of the specific rotational sublevel of $(n_1, n_2, n_3 + 1, n_4, n_5, n_6)_{238}$ populated by the laser pulse at the first wavelength are different from those of the selected rotational sublevel of $(0, 0, 1, 0, 0, 0)_{235}$ which is populated by such laser wavelength. Thus, the $^{238}UF_6$ molecules in the vibrational energy state $(n_1, n_2, n_3 + 1, n_4, n_5, n_6)_{238}$ will not in general absorb at the second laser wavelength, nor will they in general absorb at any of the other wavelengths. Any accidental coincidence of an absorption line from this state of the $^{238}UF_6$ molecules at one of the other laser wavelengths can be tolerated since these molecules would still only be excited twice. A third excitation of these molecules would require a second coincidence; two such coincidences are exceedingly unlikely and, should they occur, could be overcome by using a different laser wavelength sequence to excite the selected $^{235}UF_6$ molecules. Thus the $^{238}UF_6$ molecules excited by the first laser wavelength will in general be excited only once. Some other $^{238}UF_6$ molecules may also absorb from thermally populated levels at the other laser wavelengths, but these molecules will also be excited only once.

Since each excitation step provides approximately 625 cm$^{-1}$ of excitation energy, the six-times-excited $^{235}UF_6$ molecules will have about 3750 cm$^{-1}$ of excitation. The once-excited $^{238}UF_6$ molecules will have about 625 cm$^{-1}$ plus the thermal excitation of their initial state. Since at room temperature $kT$ is about 200 cm$^{-1}$ and the initial thermally populated state cannot have more than a few times $kT$ of excitation, the $^{238}UF_6$ molecules all have much less excitation energy than the selected $^{235}UF_6$ which are excited, in this illustrative example, six times. Thus the excitation to this high vibrational level is isotope-selective.

Collisions with other molecules can change the vibrational state of a molecule. The incident laser intensities must therefore be large enough so that the molecules are excited in a time short compared to the mean time between collisions. Typical operating conditions are a pressure of 1 Torr and 200° K (and would depend on subsequent processing of the excited molecules) where the lower temperature is used to increase the fraction of molecules in the initial state. Under these conditions, the mean time between collisions is about 100 nanoseconds (nsec.). With the laser intensities adjusted to cause excitation at each wavelength in a time of 1 nsec. or less, pulse lengths of about 50 nsec. are appropriate. Shorter length laser pulses with higher intensities may also be used. If no provision is made for removing molecules from the highest state in the excitation sequence, not all the molecules in the initial state can be excited. Instead, the populations of the seven levels in the sequence will adjust themselves so as to balance absorption and stimulated emission (assuming, as is the case here, that spontaneous emission is very slow). However, if molecules are removed from the highest excited state (for example, by photodissociation using visible or ultraviolet irradiation) in a time comparable to the excitation time, most of the molecules in the selected initial state are excited to and through the highest level in the sequence in a few excitation times. For example, if the molecules in the highest state are photodissociated with a mean time before disocciation of 1 nsec, the fraction of the molecules which is excited to the highest state and then dissociated is 90% for 50 nsec. pulses. The photodissociation process is appropriate since it requires less energy to dissociate excited molecules than nonexcited ones. Also, in the case of a chemical process to separate the excited molecules from the mixture, depending upon the chemical process utilized, the excited molecules may be more chemically reactive than the nonexcited molecules.

Only those $^{235}UF_6$ molecules in the selected initial state are separated per laser pulse in an isotope separation scheme based on isotope-selective vibrational excitation using my method. After about a collision time the initial state will be reoccupied and those $^{235}UF_6$ molecules now in this state can be separated by pulsing the laser devices again. Most of the $^{235}UF_6$ molecules can be separated by using many laser pulses. For example, the fraction of molecules in the most highly populated rotational level of the ground vibrational level at 200° K is about $7 \times 10^{-4}$. If the laser devices are each pulsed 5,000 times, about 95% of the $^{235}UF_6$ molecules can be separated. The fraction of molecules separated per laser pulse can also be increased by using more than one set of wavelengths wherein each set of wavelengths corresponds to a set of single rotational lines in the six vibrational transitions and thus separating the $^{235}UF_6$ molecules in more than one initial state.

Figure 3:
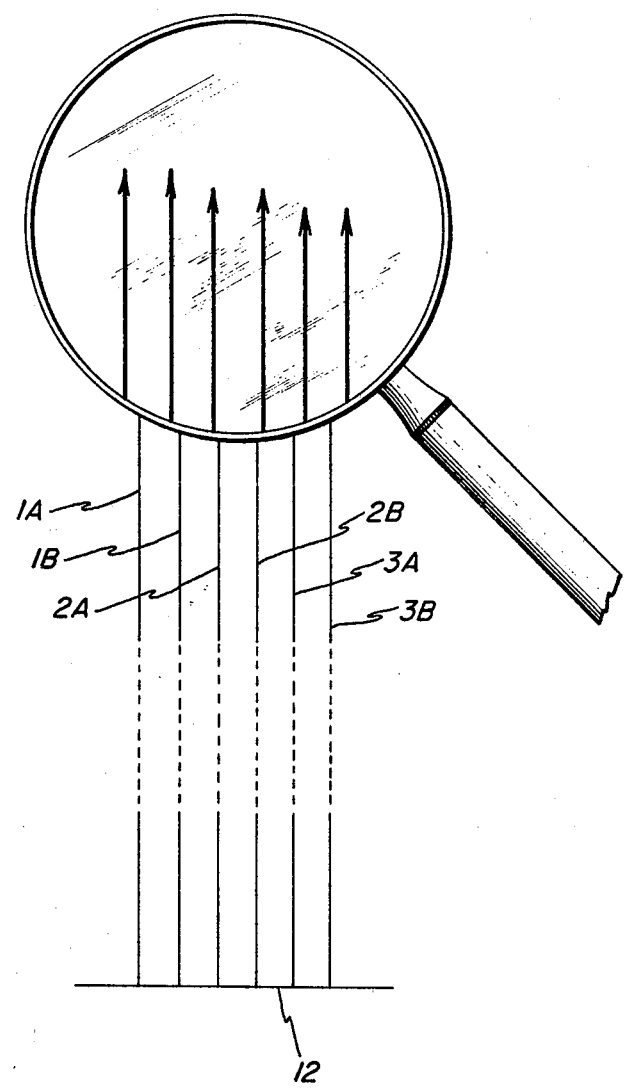
FIG. 3 is an illustration to assist in describing the energy-level diagram of FIG. 1.

The excitation method of the invention is illustrated in FIG. 1 as a three-step excitation process, employing three wavelengths to induce the energy-level transitions indicated by arrows designated 1A and 1B, 2A and 2B, and 3A and 3B, respectively. The left side of FIG. 1 shows selected vibrational energy levels of $^{235}UF_6$, while selected vibrational levels of $^{238}UF_6$ are shown on the right. The solid horizontal lines on the left, designated 4, 5, 6 and 7, are the particular vibrational levels of the sequence of levels through which it is desired to excite the $^{235}UF_6$. If each of the transitions between these states corresponds to excitation of the same mode or mode combination, then the intervals between them are approximately equal, as shown in FIG. 1, and the three wavelengths do not differ greatly. This permits use of the same type of laser to produce all the wavelengths, and is the normal case. The actual differences in energy level transitions, being so minute, cannot be discerned by viewing FIG. 1, but would be readily visible if shown on a greatly expanded scale. FIG. 3 illustrates these differences by comparing lengths of equal length pairs of arrows 1A and 1B, 2A and 2B, and 3A and 3B of FIG. 1, under magnification, measured from a common starting line 12. However, this approximately equal spacing is not necessarily required, and use of substantially different wavelengths is possible. The solid lines on the right, designated 8, 9, 10 and 11, are the respective corresponding levels of $^{238}UF_6$. Although the energies of the latter $^{238}UF_6$ levels actually differ from the energies of the former $^{235}UF_6$ levels because of the isotope shift, the difference is too small to be visible on an energy level diagram of this scale.

Level 4, the desired $^{235}UF_6$ starting level, must be near enough to the ground vibrational state to have a significant population, preferably within an energy $kT$ of the ground state. The first laser wavelength is selected to excite molecules from state 4 to state 5, the transition being indicated by one of arrows 1A. State 5 should be above the region of significant thermal population. Because of complexity of the absorption spectra with many overlapping absorption lines, some other transitions upward from thermally populated levels are excited by the same wavelength. States involved in these undesired transitions are shown by broken lines, and two such transitions for $^{235}UF_6$ are illustrated by additional arrows 1A.

Because of the isotope shift, transition from state 8 to state 9 of $^{238}UF_6$ is not excited. However, because of the complexity of the absorption spectra with many overlapping lines, other $^{238}UF_6$ transitions are excited by this wavelength. Three such transitions are illustrated by arrows 1B on the $^{238}UF_6$ energy level diagram. Thus, use of a single wavelength excites both $^{235}UF_6$ and $^{238}UF_6$ molecules, but to different states.

A second wavelength used to excite $^{235}UF_6$ molecules from state 5 to state 6 is designated by an arrow 2A on the $^{235}UF_6$ energy level diagram. Because of the complexity of the absorption spectrum with many overlapping lines, this wavelength will also be absorbed by $^{235}UF_6$ and $^{238}UF_6$ molecules in thermally populated areas. This absorption induces additional undesired transitions illustrated by additional arrows 2A in the $^{235}UF_6$ energy level diagram and by arrows 2B in the $^{238}UF_6$ energy level diagram. However, since the absorption spectrum from each individual state is comprised of lines which are widely spaced compared to their width, generally none of the undesired states populated by the first wavelength will absorb energy at the second wavelength. Therefore, no undesired transitions from states near energy levels 5 or 9 to states near energy levels 6 or 10 are induced.

Similarly, a third wavelength selected to induce the transition of $^{235}UF_6$ molecules from state 6 to state 7, illustrated by an arrow 3A on the $^{235}UF_6$ energy level diagram will, in general, not be absorbed by any of the states previously populated by undesired transitions. The only undesired transitions induced by this third wavelength are transitions originating on thermally populated levels terminating in the vicinity of levels 5 and 9. Such transitions are illustrated by additional arrow 3A in the $^{235}UF_6$ energy-level diagram and arrows 3B in the $^{238}UF_6$ energy-level diagram.

After irradiation by all three wavelengths, only the $^{235}UF_6$ molecules excited to state 7 are relatively highly excited. The other molecules excited by undesired transitions are relatively less excited, to levels in the vicinity of levels 5 and 9. If desired, additional wavelengths may be used to further excite the molecules in state 7.

The spectral width (line width) of each laser pulse is of the order of the Doppler width which depends on the temperature, molecule mass, and center frequency of transition, and for the first vibrational transition of $^{235}UF_6$ is approximately $4 \times 10^{-4}$ cm$^{-1}$.

Figure 2:
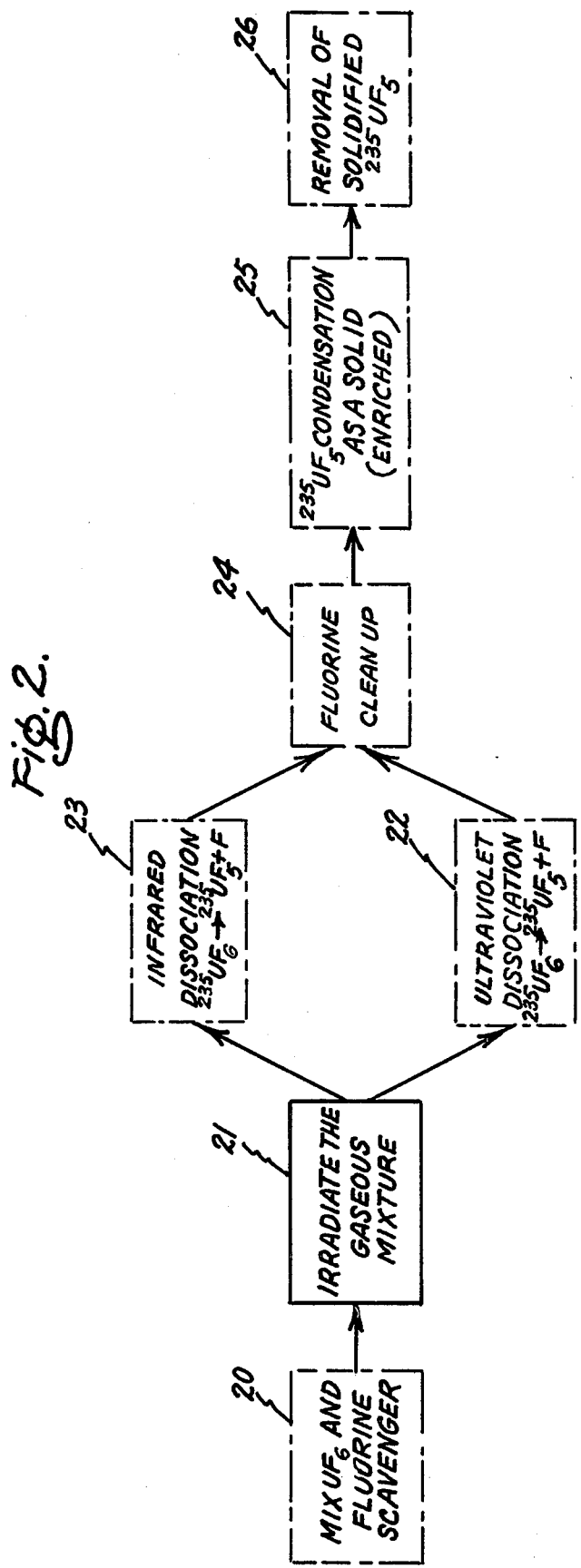
FIG. 2 is a flow diagram illustrating use of the invention in an isotope separation process, the boxes enclosed in phantom lines representing prior art steps.

FIG. 2 is a flow diagram illustrating where the irradiation performed according to the invention fits into an entire isotope separation process, the prior art steps being designated within phantom line boxes. As a first step 20, gaseous $UF_6$ is mixed with a gaseous fluorine scavenger, such as hydrogen. The irradiation process 21 of the invention then vibrationally excites the $^{235}UF_6$ molecules from a vibrational-rotational level of the ground electronic state. The excited molecules may then be irradiated further, either with laser-generated ultraviolet radiation 22 or with laser-generated infrared irradiation 23. In either case, dissociation of the vibrationally-excited $^{235}UF_6$ molecules occurs, resulting in the products $^{235}UF_5$ + F. The fluorine scavenger then reacts 24 with the free fluorine molecules to leave $^{235}UF_5$ and thereby prevents reformation of $^{235}UF_6$ molecules. The $^{235}UF_5$ molecules condense 25 in the form of a solid, and are removed 26 as the output product.

As stated above, the method of my invention is not limited to the uranium hexafluoride compound but is generally applicable to any gaseous state polyatomic molecule having an absorption spectrum in the infrared region complicated by multiple contributions from a plurality of thermally populated energy levels such that the isotope shifts are masked. An example of another hexafluoride that may be isotope-selective vibrationally excited by the method of my invention is tungsten hexafluoride which has an infrared fundamental absorption band at 14 μm.

From the foregoing description, it can be appreciated that my invention makes available a new method for isotope-selective vibrational excitation of polyatomic molecules as a step in an optical isotope separation process. My invention is relatively simple in that the steps of my invention involve irradiation of a gaseous mixture including the desired isotopic compound with laser pulses of predetermined wavelengths in the infrared band. The laser pulses are of slightly different wavelength corresponding to specific selected rotational lines of a particular vibrational band. A plurality of laser pulses at each wavelength sufficient to obtain a desired degree of isotope separation are utilized.

It may be economically advantageous to further excite the $^{235}UF_6$ molecules vibrationally or to use fewer steps of vibrational excitation. It is, therefore, to be understood that changes may be made in the particular embodiment of my invention as described which are within the full intended scope of my invention as defined by the following claims.

What I claim as new and desire to secure by Letters Patent of the United States is:

1. In a process for separating isotopes in a gaseous mixture of polyatomic molecules having a vibrational energy absorption spectrum of molecular absorption lines in the infrared complicated by multiple contributions from a plurality of thermally populated energy levels so that the isotope shifts are masked, the method of isotope-selective vibrational excitation of the desired isotopic molecules comprising irradiating the gaseous mixture from a radiation source means emitting radiation of line width of the order of the Doppler width of said molecular absorption lines in the infrared spectrum at a first wavelength defining a first selected vibrational-rotational line of a first vibrational energy level transition of the desired isotopic molecules so that a fraction of the desired isotopic molecules are raised to a first higher vibrational energy level whereas a fraction of the undesired isotopic molecules may also be raised to a first higher vibrational energy level, and irradiating the gaseous mixture from a radiation source means emitting radiation of line width of the order of the Doppler width of said molecular absorption lines in the infrared spectrum at a second wavelength different from the first wavelength and defining a second selected vibrational-rotational line of a second vibrational energy level transition of the desired isotopic molecules so that a substantial portion of the fraction of desired isotopic molecules raised to the first higher vibrational energy level are raised to a second vibrational energy level higher than the first whereas the undesired isotopic molecules that were raised to the first higher vibrational energy level are not raised to a second higher vibrational energy level higher than the first except those that may be so excited due to an accidental coincidence of an absorption line with the second wavelength so that the desired isotopic molecules are vibrationally excited to an energy level substantially unpopulated by the undesired isotopic molecules.

2. The method set forth in claim 1 and further comprising irradiating the gaseous mixture from a radiation source means emitting radiation of line width of the order of the Doppler width of said molecular absorption lines in the infrared spectrum at a third wavelength different from the first and second wavelengths and defining a third selected vibrational-rotational line of a third vibrational energy level transition of the desired isotopic molecules so that a substantial portion of the fraction of desired isotopic molecules raised to the second higher vibrational energy level are raised to a third vibrational energy level higher than the second whereas any of the undesired isotopic molecules that were raised to the second higher vibrational energy level are not raised to a third vibrational energy level higher than the second.

3. The method set forth in claim 1 and further comprising irradiating the gaseous mixture from a radiation source means emitting radiation of line width of the order of the Doppler width of said molecular absorption lines in the infrared spectrum at a plurality of wavelengths different from the first and second wavelengths and defining a plurality of selected vibrational-rotational lines of a plurality of vibrational energy level transitions of the desired isotopic molecules higher than the second vibrational transition so that a fraction of the desired isotopic molecules are excited to higher vibrational energy levels which are substantially completely unpopulated by the undesired isotopic molecules.

4. The method set forth in claim 3 wherein
the radiation source means for each irradiation is a separate pulsed laser device so that a plurality of laser devices equal to the number of selected vibrational-rotational lines are simultaneously pulsed.

5. The method set forth in claim 3 wherein
the radiation source means for each irradiation is a single pulsed laser device having the capability for emitting all the desired wavelengths simultaneously.

6. The method set forth in claim 4 wherein
the irradiations of the gaseous mixture consists of directing a plurality of pulses of the infrared radiation emitted from each laser device toward the gaseous mixture wherein the pulses emitted from each laser device are at a constant wavelength so that a greater fraction of the desired isotopic molecules are vibrationally excited than if only a single pulse from each laser device was utilized.

7. The method set forth in claim 6 wherein
the duration and intensity of each laser pulse are sufficient for the desired isotopic molecules to undergo the plurality of vibrational transitions in substantially less than the average collision time for the gas molecules.

8. The method set forth in claim 6 wherein the duration of each laser pulse is approximately 50 nanoseconds and the intensity is such that each vibrational transition requires up to approximately 1 nanosecond.

9. The method set forth in claim 1 and further comprising irradiating the gaseous mixture from a radiation source means emitting radiation of line width of the order of the Doppler width of said molecular absorption lines in the infrared spectrum at a third wavelength different from the first wavelength and defining a second selected vibrational-rotational line of the first vibrational energy level transition of the desired isotopic molecules, and irradiating the gaseous mixture from a radiation source means emitting radiation of line width of the order of the Doppler width of said molecular absorption lines in the infrared spectrum at a fourth wavelength different from the second wavelength and defining a second selected vibrational-rotational line of the second vibrational energy level transition of the desired isotopic molecules so that a greater fraction of the desired isotopic molecules are raised to the second higher vibrational energy level than if only a single vibrational-rotational line in each vibrational energy level transition were excited.

10. In a process for separating isotopes in a gaseous mixture of polyatomic molecules having a vibrational energy absorption of molecular absorption lines in the infrared, the method of isotope-selective vibrational excitation of the desired isotopic molecules comprising irradiating the gaseous mixture from a radiation source means emitting pulsed radiation of line width of the order of the Doppler width of said molecular absorption lines in the infrared spectrum at a first plurality of closely spaced wavelengths defining a like plurality of selected vibrational-rotational lines of first vibrational energy level transitions of the desired isotopic molecules so that a significant fraction of the desired isotopic molecules are raised to first higher vibrational energy levels whereas a fraction of the undesired isotopic molecules may also be raised to first higher vibrational energy levels, and irradiating the gaseous mixture from a radiation source means emitting pulsed radiation of line width of the order of the Doppler width of said molecular absorption lines in the infrared spectrum at a second plurality of closely spaced wavelengths different from the first wavelengths and defining a like second plurality of selected vibrational-rotational lines of second vibrational energy level transitions of the desired isotopic molecules so that a substantial portion of the significant fraction of desired isotopic molecules raised to the first higher vibrational energy levels are raised to second vibrational energy levels higher than the first whereas none of the undesired isotopic molecules that were raised to the first higher vibrational energy levels may also be raised to second higher vibrational energy levels higher than the first except those which have an accidental coincidence of an absorption line with one of the irradiated wavelengths so that the desired isotopic molecules are vibrationally excited to energy levels substantially unpopulated by the undesired isotopic molecules.

11. The method set forth in claim 10 and further comprising irradiating the gaseous mixture from a radiation source means emitting pulsed radiation of line width of the order of the Doppler width of said molecular absorption lines in the infrared spectrum at a third plurality of closely spaced wavelengths different from the first and second wavelengths and defining a like third plurality of selected vibrational-rotational lines of third vibrational energy level transitions of the desired isotopic molecules so that a substantial portion of the desired isotopic molecules raised to the second higher vibrational energy levels are raised to third vibrational energy levels higher than the second whereas substantially none of the undesired isotopic molecules that were raised to the second higher vibrational energy levels may be raised to third vibrational energy levels higher than the second.

12. The method set forth in claim 1 wherein
the gaseous mixture is a mixture of hexafluoride compounds.

13. The method set forth in claim 1 wherein
the desired isotopic molecules are $^{235}UF_6$ and the undesired molecules are $^{238}UF_6$.

14. The method set forth in claim 6 wherein
the spectral width of each laser pulse is approximately equal to the Doppler width.

15. The method set forth in claim 6 wherein
each pulsed laser device generates approximately 5000 pulses.

16. The method set forth in claim 13 wherein
the wavelengths of emission of the radiation source means emitting at the first and second wavelengths is in the region of 16 micrometers.

* * * * *